US007128093B2

(12) United States Patent
Silverbrook

(10) Patent No.: US 7,128,093 B2
(45) Date of Patent: Oct. 31, 2006

(54) MEMS FLUID EJECTION DEVICE CONFIGURED FOR DETECTING A FAULT CONDITION

(75) Inventor: Kia Silverbrook, Balmain (AU)

(73) Assignee: Silverbrook Research Pty Ltd, Balmain (AU)

(*) Notice: Subject to any disclaimer, the term of this patent is extended or adjusted under 35 U.S.C. 154(b) by 46 days.

(21) Appl. No.: 11/165,198

(22) Filed: Jun. 24, 2005

(65) Prior Publication Data

US 2005/0275492 A1 Dec. 15, 2005

Related U.S. Application Data

(63) Continuation of application No. 10/949,346, filed on Sep. 27, 2004, now Pat. No. 6,969,142, which is a continuation of application No. 10/636,273, filed on Aug. 8, 2003, now Pat. No. 6,802,587, which is a continuation of application No. 09/575,175, filed on May 23, 2000, now Pat. No. 6,629,745.

(30) Foreign Application Priority Data

Jun. 30, 1999 (AU) .................................... PQ1309

(51) Int. Cl.
*F16K 37/00* (2006.01)

(52) U.S. Cl. ........................ 137/553; 137/554; 347/19; 251/129.01; 310/306

(58) Field of Classification Search ........... 251/129.01, 251/129.05; 137/553–556.6; 347/19, 54; 310/306; 361/93.1, 93.2

See application file for complete search history.

(56) References Cited

U.S. PATENT DOCUMENTS

| | | | |
|---|---|---|---|
| 4,483,194 | A | 11/1984 | Rudolf |
| 5,355,712 | A | 10/1994 | Petersen et al. |
| 5,384,507 | A | 1/1995 | Takada et al. |
| 5,455,608 | A | 10/1995 | Stewart et al. |
| 5,457,368 | A | 10/1995 | Jacobsen et al. |
| 6,087,743 | A | 7/2000 | Guckel et al. |
| 6,264,302 | B1 | 7/2001 | Imanaka et al. |
| 6,275,326 | B1 | 8/2001 | Bhalla et al. |
| 6,510,752 | B1 | 1/2003 | Sacks et al. |
| 6,629,448 | B1 | 10/2003 | Cvancara |

FOREIGN PATENT DOCUMENTS

EP 0887186 A 12/1998

OTHER PUBLICATIONS

"Design, Fabrication and Testing of a C-shape Actuator" (Lin G et al) International Conference on Solid-State Sensors and Actuators and Eurosensors, vol. 2, Jun. 25, 1995 pp. 416-419 XP 020305150—the whole document**.

*Primary Examiner*—Ramon M. Barrera

(57) ABSTRACT

A microelectromechanical fluid ejection device configured for detecting a fault condition is provided. The device comprises a mechanical actuator, drive circuitry and a switch device. The actuator is displaceable upon receipt of an electrical current from the drive circuitry and the displacement causes ejection of fluid from an aperture in the device. The switch device determines an extent of displacement of the actuator and comprises a contact element positioned for contact with the actuator; and processing circuitry for detecting when the actuator makes contact with the contact element.

5 Claims, 11 Drawing Sheets

MEMS FLUID EJECTION DEVICE CONFIGURED FOR DETECTING A FAULT CONDITION

CROSS REFERENCE TO RELATED APPLICATIONS

The present application is a Continuation of U.S. application Ser. No. 10/949,346 filed on Sep. 27, 2004, now issued as U.S. Pat. No. 6,969,142, which is a Continuation of U.S. application Ser. No. 10/636,273 filed on Aug. 8, 2003, now issued as U.S. Pat. No. 6,802,587, which is a Continuation of U.S. application Ser. No. 09/575,175 filed on May 23, 2000, now issued as U.S. Pat. No. 6,629,745.

CO-PENDING APPLICATIONS

Various methods, systems and apparatus relating to the present invention are disclosed in the following co-pending applications/granted patents filed by the applicant or assignee of the present invention simultaneously with the present application:

| | | | |
|---|---|---|---|
| 09/575,197, | 09/575,195, | 09/575,159, | 09/575,132, |
| 09/575,123, | 6,825,945 | 09/575,130, | 09/575,165, |
| 6,813,039, | 09/575,118, | 09/575,131, | 09/575,116, |
| 9/575,144, | 6,824,044, | 09/575,186, | 6,681,045, |
| 6,728,000, | 09/575,145, | 09/575,192, | 09/575,181, |
| 09/575,193, | 09/575,183, | 6,789,194, | 09/575,150, |
| 6,789,191, | 6,644,642, | 6,502,614, | 6,622,999, |
| 6,669,385, | 6,549,935, | 09/575,187, | 6,727,996, |
| 6,591,884, | 6,439,706, | 6,760,119, | 09/575,198, |
| 6,290,349, | 6,428,155, | 6,785,016, | 09/575,174, |
| 6,822,639, | 6,737,591, | 09/575,154, | 09/575,129, |
| 6,830,196, | 09/575,188, | 09/575,189, | 09/575,162, |
| 09/575,172, | 09/575,170, | 09/575,171, | 09/575,161, |
| 6,428,133, | 6,526,658, | 6,315,699 | 6,338,548, |
| 6,540,319, | 6,328,431, | 6,328,425, | 09/575,127, |
| 6,383,833, | 6,464,332, | 6,390,591, | 09/575,152, |
| 6,328,417, | 6,409,323, | 6,281,912 | 6,604,810, |
| 6,318,920, | 6,488,422, | 6,795,215, | 09/575,109, |
| 09/575,110 | 09/575,182 | 09/575,193 | 6,416,160 |
| 6,238,043 | 09/575,119 | 09/575,135 | 09/575,157 |
| 6,553,459 | 09/575,134 | 09/575,121 | 09/575,137 |
| 09/575,167 | 09/575,120 | 09/575,122 | |

The disclosures of these co-pending applications are incorporated herein by cross-reference.

FIELD OF THE INVENTION

This invention relates to a method of detecting and, if appropriate, remedying a fault in a micro-electromechanical device. The invention has application in ink ejection nozzles of the type that are fabricated by integrating the technologies applicable to micro electro-mechanical systems (MEMS) and complementary metal-oxide semiconductor (CMOS) integrated circuits, and the invention is hereinafter described in the context of that application. However, it will be understood that the invention does have broader application, to the remedying of faults within various types of MEM devices.

BACKGROUND OF THE INVENTION

A high speed pagewidth inkjet printer has recently been developed by the present Applicant. This typically employs in the order of 51200 inkjet nozzles to print on A4 size paper to provide photographic quality image printing at 1600 dpi.

In order to achieve this nozzle density, the nozzles are fabricated by integrating MEMS-CMOS technology.

A difficulty that flows from the fabrication of such a printer is that there is no convenient way of ensuring that all nozzles that extend across the printhead or, indeed, that are located on a given chip will perform identically, and this problem is exacerbated when chips that are obtained from different wafers may need to be assembled into a given printhead. Also, having fabricated a complete printhead from a plurality of chips, it is difficult to determine the energy level required for actuating individual nozzles, to evaluate the continuing performance of a given nozzle and to detect for any fault in an individual nozzle.

SUMMARY OF THE INVENTION

According to the invention, there is provided a method of detecting a fault condition in a micro-electromechanical device, the method comprising the steps of:

applying at least one current pulse to an actuator of the device such that the actuator is cyclically displaced at least once;

determining an extent of displacement of the actuator;

calibrating the device by determining a relationship between an operational parameter and said displacement; and testing the device by applying said parameter to the device, such that an error is detectable where said relationship is not achieved.

The step of applying at least one current pulse to the actuator may comprise the step of applying a series of current pulses to the actuator.

The step of determining the extent of displacement of the actuator may include the step of generating an electrical signal when the actuator is displaced to said extent.

The step of generating the electrical signal may include the step of establishing a switch that is operable upon displacement of the actuator to direct the current from the actuator to processing circuitry upon displacement of the actuator to said extent, such that a switch contact is positioned to correspond with said extent of displacement.

The step of calibrating the device may include the step of applying the series of current pulses to be of increasing duration until such time as the switch closes and a series of the electrical signals are generated such that a current pulse of a particular duration corresponds with said extent of displacement.

The step of testing the device may include the step of applying a series of current pulses of said particular duration and determining whether or not said series of electrical signals are generated.

The present invention may be defined broadly as providing a method of detecting a fault within a micro electromechanical device of a type having a support structure, an actuating arm that is movable relative to the support structure under the influence of heat inducing current flow through the actuating arm and a movement sensor associated with the actuating arm. The method comprises the steps of:

(a) passing at least one current pulse having a predetermined duration $t_p$ through the actuating arm, and (b) detecting for a predetermined level of movement of the actuating arm.

The method as above defined permits in-service fault detection of the micro electro-mechanical (MEM) device. If the predetermined level of movement is not detected following passage of the current pulse of the predetermined duration through the arm, it might be assumed that movement of the arm is impeded, for example as a consequence of a fault having developed in the arm or as a consequence of an impediment blocking the movement of the arm.

If it is concluded that a fault in the form of a blockage exists in the MEM device, an attempt may be made to clear the fault by passing at least one further current pulse (having a higher energy level) through the actuating arm.

Thus, the present invention may be further defined as providing a method of detecting and remedying a fault within an MEM device. The two-stage method comprises the steps of:

(a) detecting the fault in the manner as above defined, and
(b) remedying the fault by passing at least one further current pulse through the actuating arm at an energy level greater than that of the fault detecting current pulse.

If the remedying step fails to correct the fault, the MEM device may be taken out of service and/or be returned to a supplier for service.

The fault detecting method may be effected by passing a single current pulse having a predetermined duration $t_p$ through the actuating arm and detecting for a predetermined level of movement of the actuating arm. Alternatively, a series of current pulses of successively increasing duration $t_p$ may be passed through the actuating arm in an attempt to induce successively increasing degrees of movement of the actuating arm over a time period t. Then, detection will be made for a predetermined level of movement of the actuating arm within a predetermined time window $t_w$ where $t>t_w>t_p$.

PREFERRED FEATURES OF THE INVENTION

The fault detection method of the invention preferably is employed in relation to an MEM device in the form of a liquid ejector and most preferably in the form of an ink ejection nozzle that is operable to eject an ink droplet upon actuation of the actuating arm. In this latter preferred form of the invention, the second end of the actuating arm preferably is coupled to an integrally formed paddle which is employed to displace ink from a chamber into which the actuating arm extends.

The actuating arm most preferably is formed from two similarly shaped arm portions which are interconnected in interlapping relationship. In this embodiment of the invention, a first of the arm portions is connected to a current supply and is arranged in use to be heated by the current pulse or pulses having the duration $t_p$. However, the second arm portion functions to restrain linear expansion of the actuating arm as a complete unit and heat induced elongation of the first arm portion causes bending to occur along the length of the actuating arm. Thus, the actuating arm is effectively caused to pivot with respect to the support structure with heating and cooling of the first portion of the actuating arm.

The invention will be more fully understood from the following description of a preferred embodiment of a fault detecting method as applied to an inkjet nozzle as illustrated in the accompanying drawings.

DETAILED DESCRIPTION OF THE INVENTION

Figure 1:
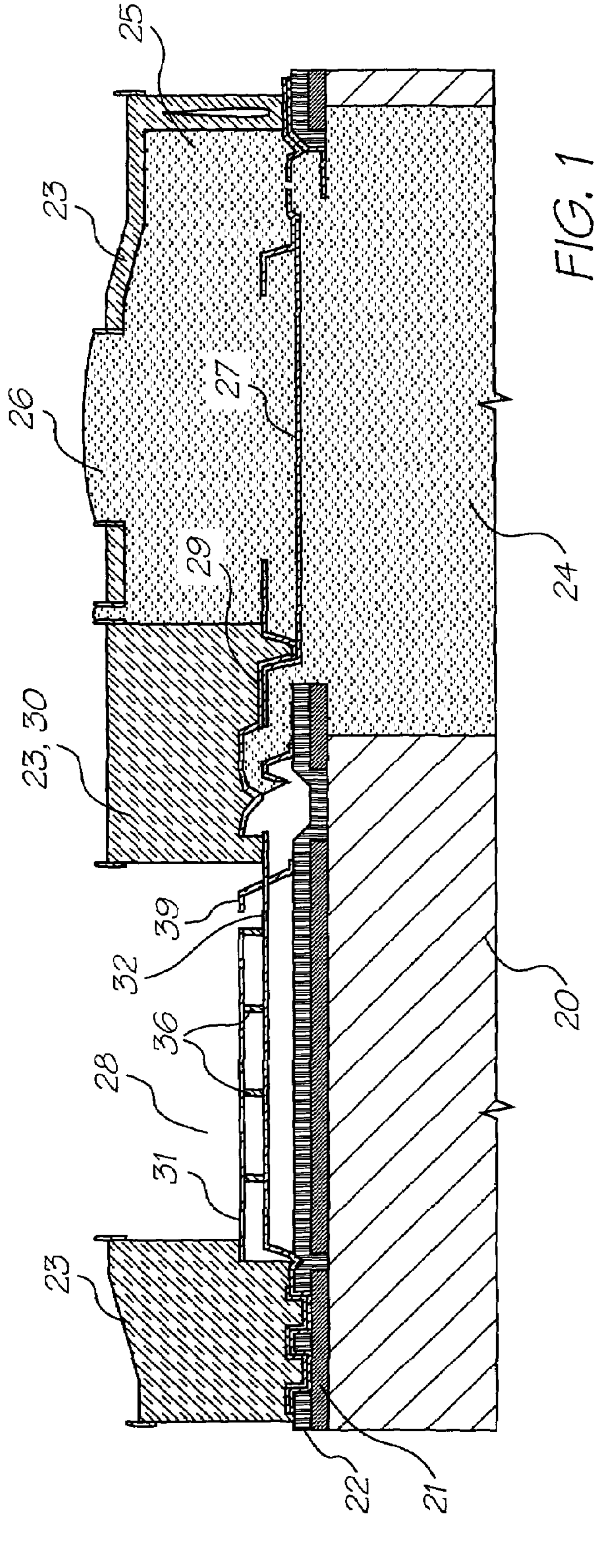
FIG. 1 shows a highly magnified cross-sectional elevation view of a portion of the inkjet nozzle.
Figure 2:
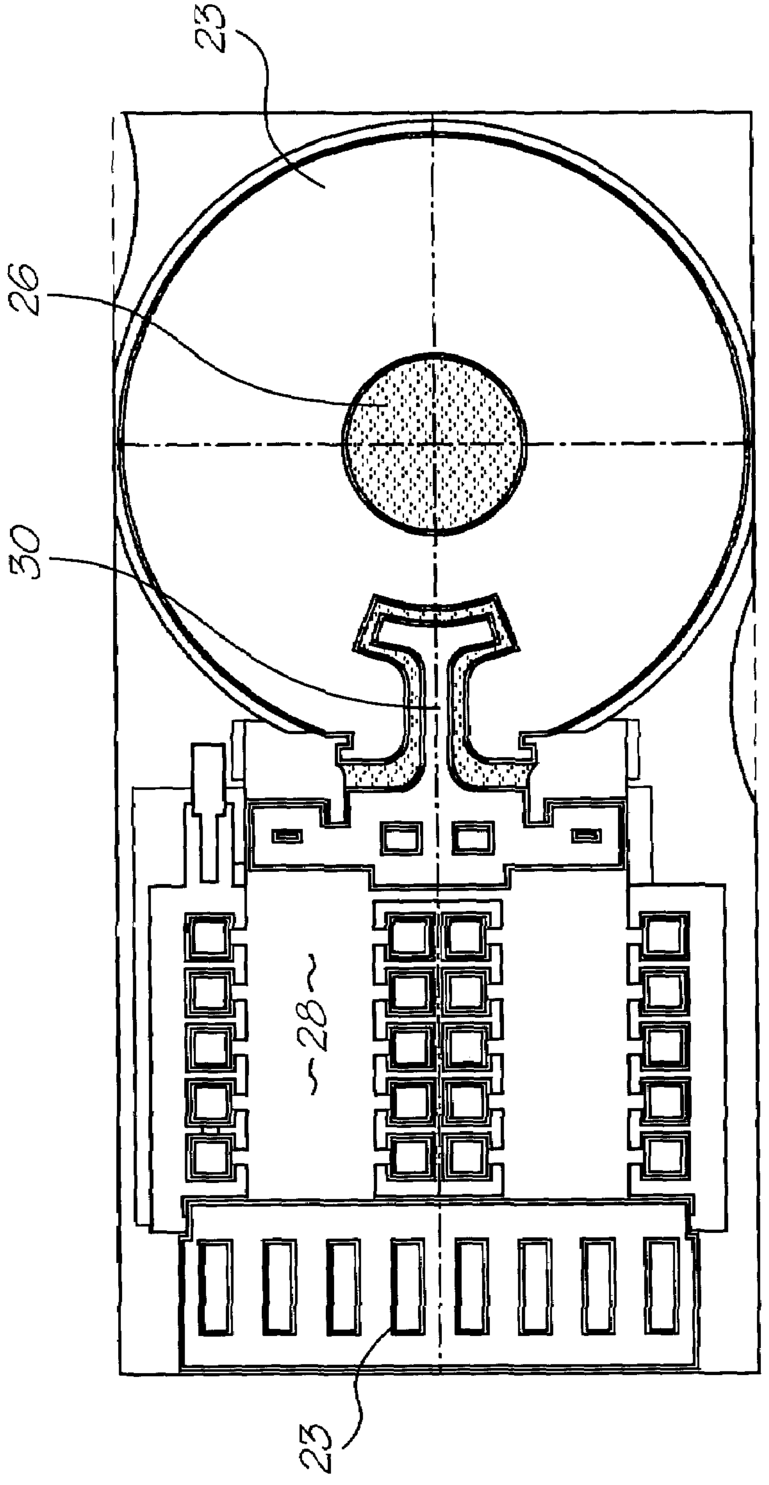
FIG. 2 shows a plan view of the inkjet nozzle of FIG. 1.

As illustrated with approximately 3000× magnification in FIG. 1 and other relevant drawing figures, a single inkjet nozzle device is shown as a portion of a chip that is fabricated by integrating MEMS and CMOS technologies. The complete nozzle device includes a support structure having a silicon substrate 20, a metal oxide semiconductor layer 21, a passivation layer 22, and a non-corrosive dielectric coating/chamber-defining layer 23.

Figure 7:
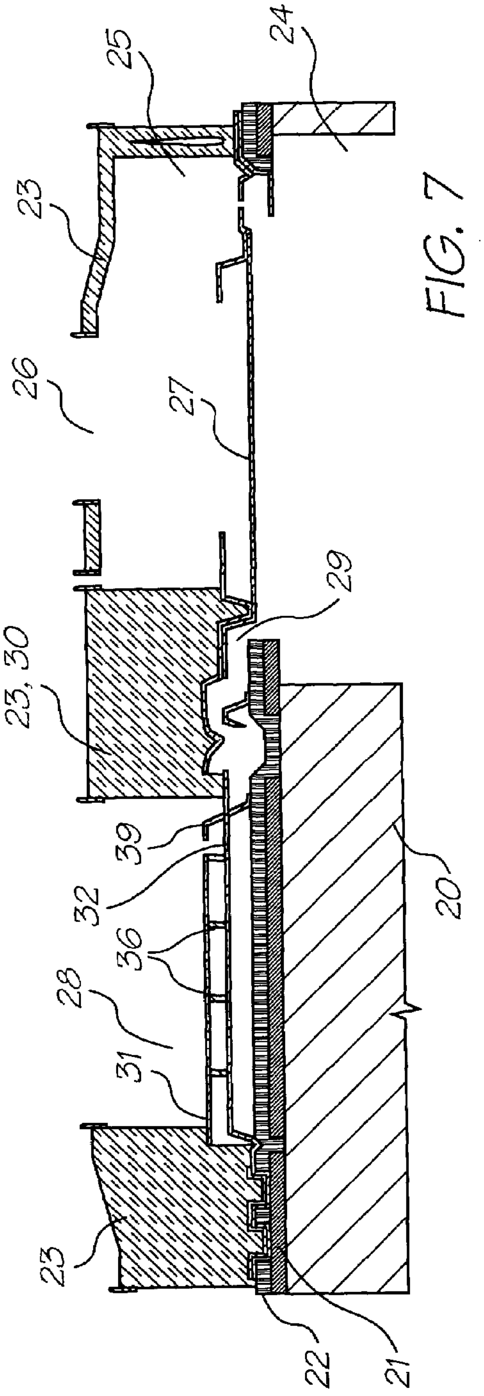
FIG. 7 shows a sectional elevation view of the nozzle of FIG. 1 but prior to charging with ink.

The nozzle device incorporates an ink chamber 24 which is connected to a source (not shown) of ink and, located above the chamber, a nozzle chamber 25. A nozzle opening 26 is provided in the chamber-defining layer 23 to permit displacement of ink droplets toward paper or other medium (not shown) onto which ink is to be deposited. A paddle 27 is located between the two chambers 24 and 25 and, when in its quiescent position, as indicated in FIGS. 1 and 7, the paddle 27 effectively divides the two chambers 24 and 25.

The paddle 27 is coupled to an actuating arm 28 by a paddle extension 29 and a bridging portion 30 of the dielectric coating 23.

Figure 3:
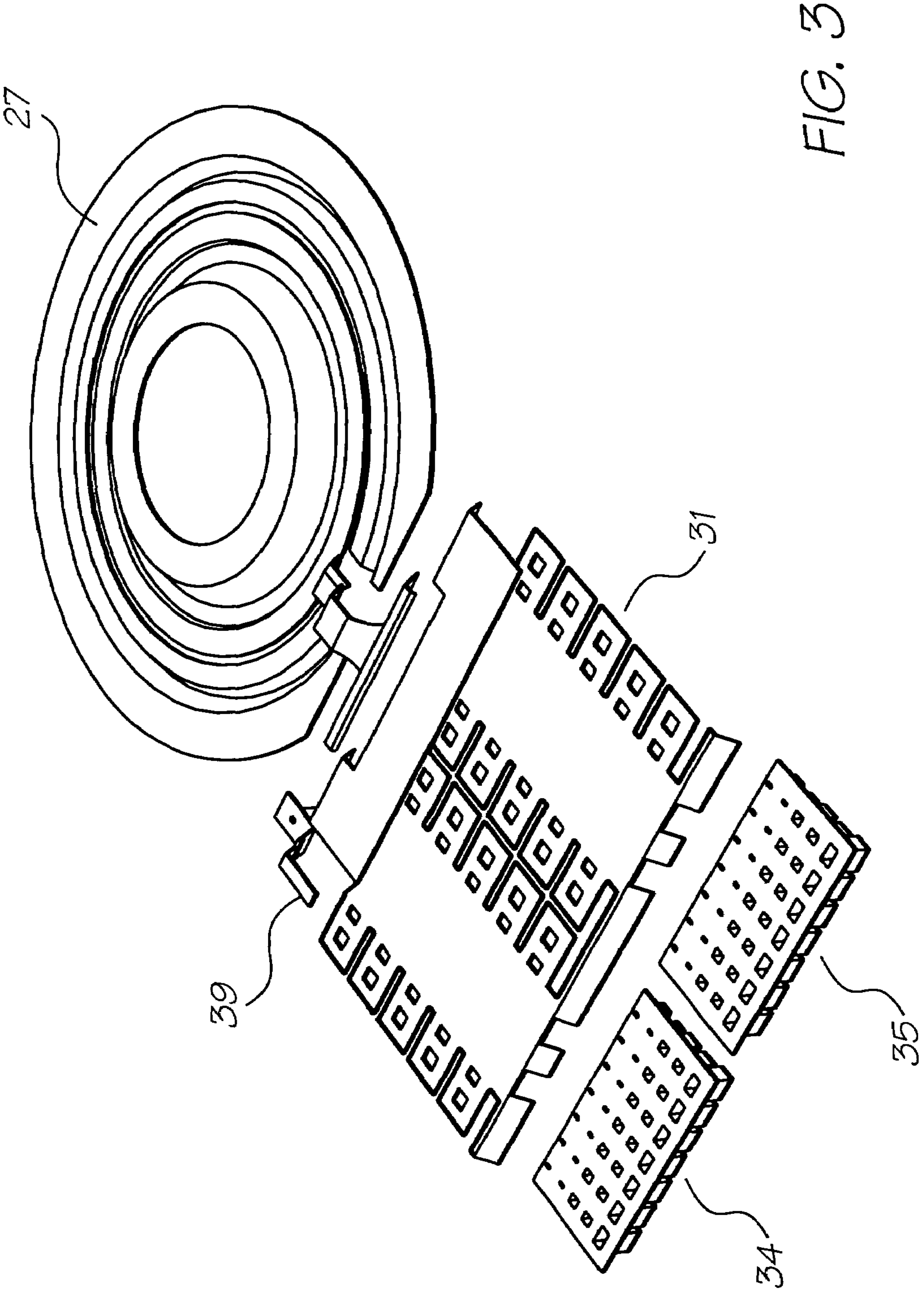
FIG. 3 shows a perspective view of an outer portion of an actuating arm and an ink ejecting paddle or of the inkjet nozzle, the actuating arm and paddle being illustrated independently of other elements of the nozzle.
Figure 4:
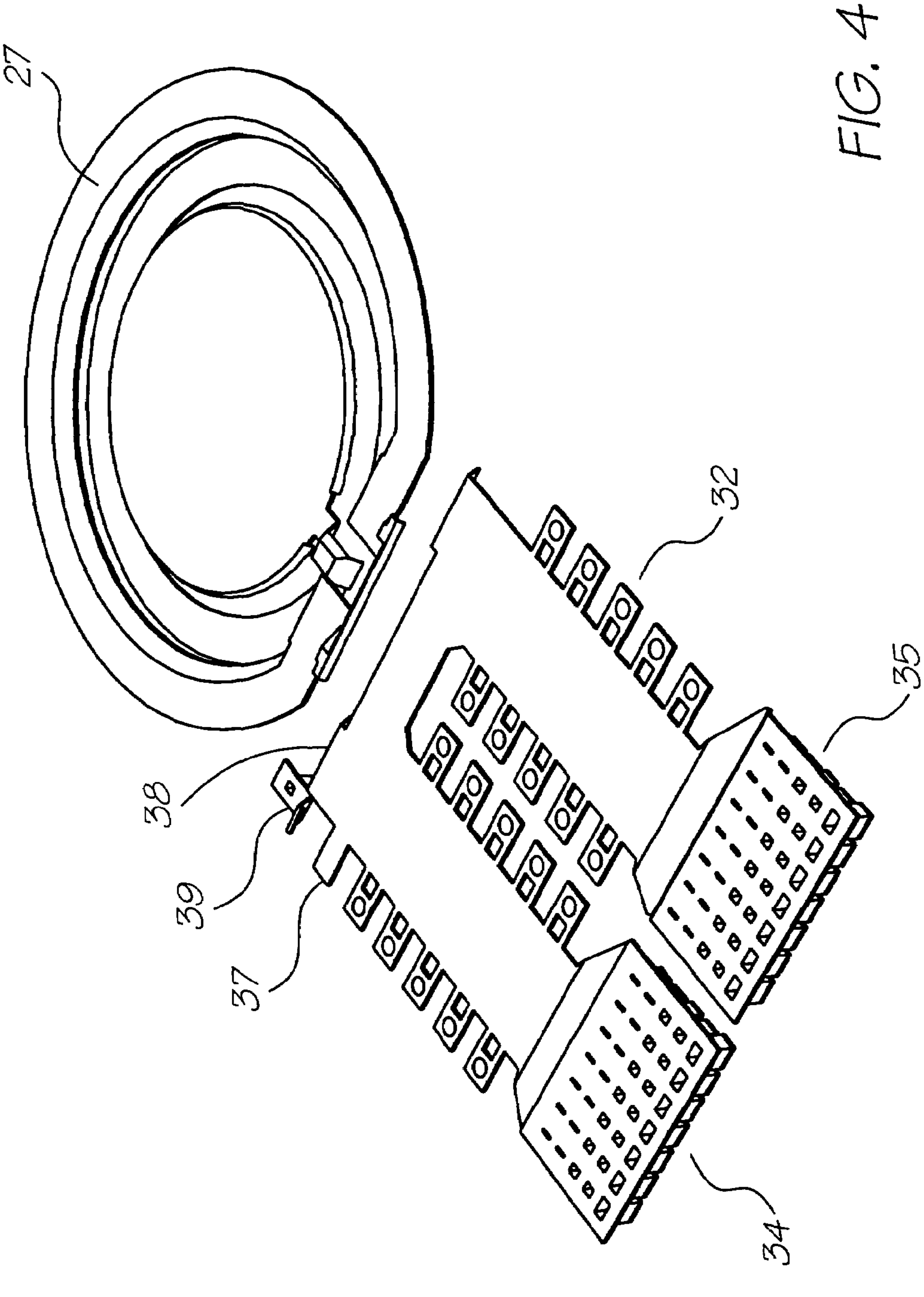
FIG. 4 shows an arrangement similar to that of FIG. 3 but in respect of an inner portion of the actuating arm.
Figure 5:
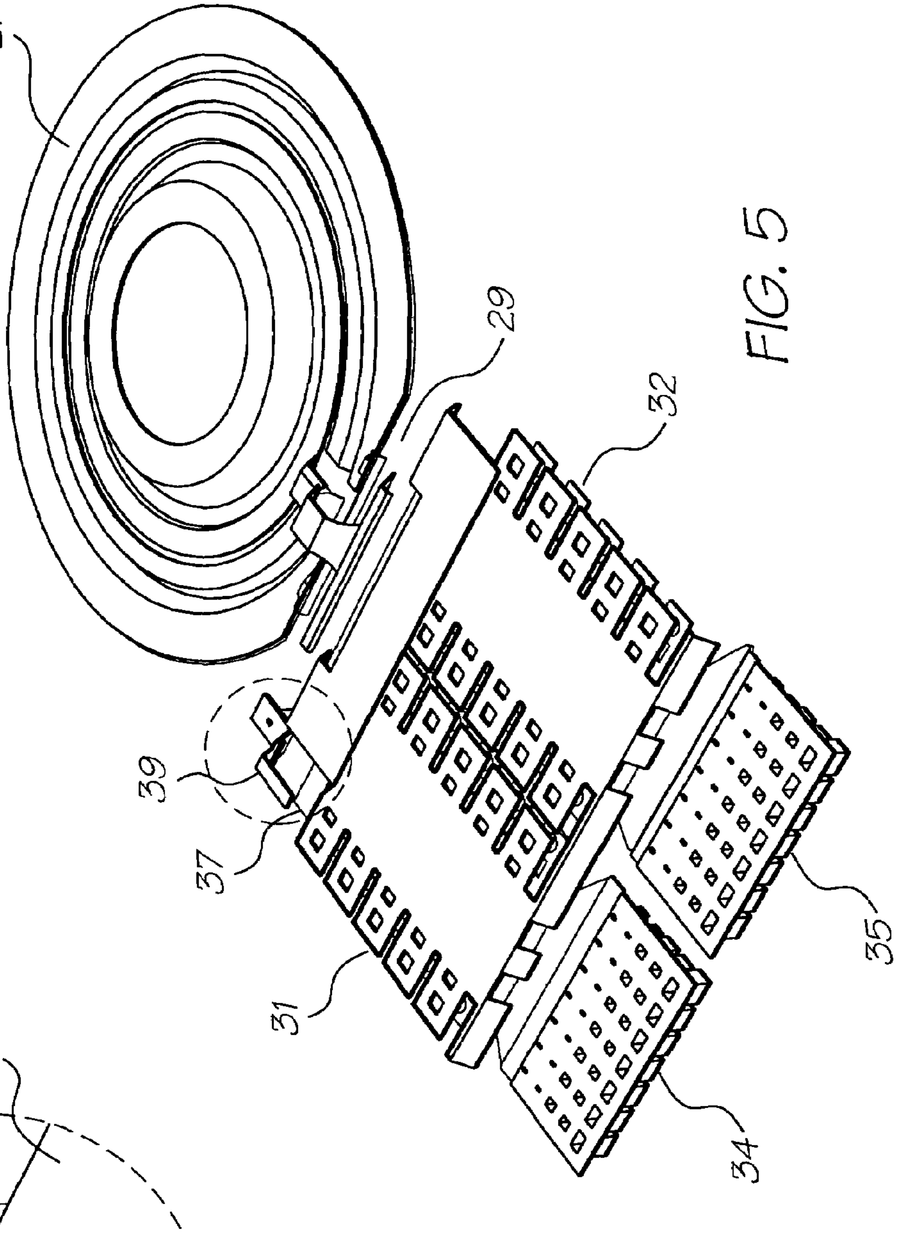
FIG. 5 shows an arrangement similar to that of FIGS. 3 and 4 but in respect of the complete actuating arm incorporating the outer and inner portions shown in FIGS. 3 and 4.
Figure 6:
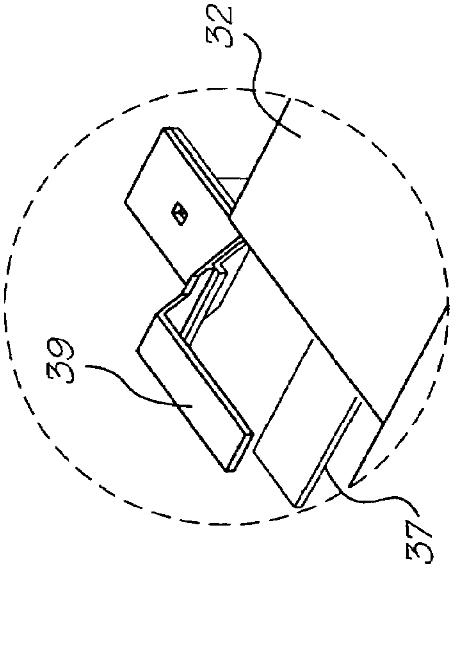
FIG. 6 shows a detailed portion of a movement sensor arrangement that is shown encircled in FIG. 5.

The actuating arm 28 is formed (i.e. deposited during fabrication of the device) to be pivotable with respect to the support structure or substrate 20. That is, the actuating arm has a first end that is coupled to the support structure and a second end 38 that is movable outwardly with respect to the support structure. The actuating arm 28 comprises outer and inner arm portions 31 and 32. The outer arm portion 31 is illustrated in detail and in isolation from other components of the nozzle device in the perspective view shown in FIG. 3. The inner arm portion 32 is illustrated in a similar way in FIG. 4. The complete actuating arm 28 is illustrated in perspective in FIG. 5, as well as in FIGS. 1, 7, 8, 9 and 10.

Figure 11:
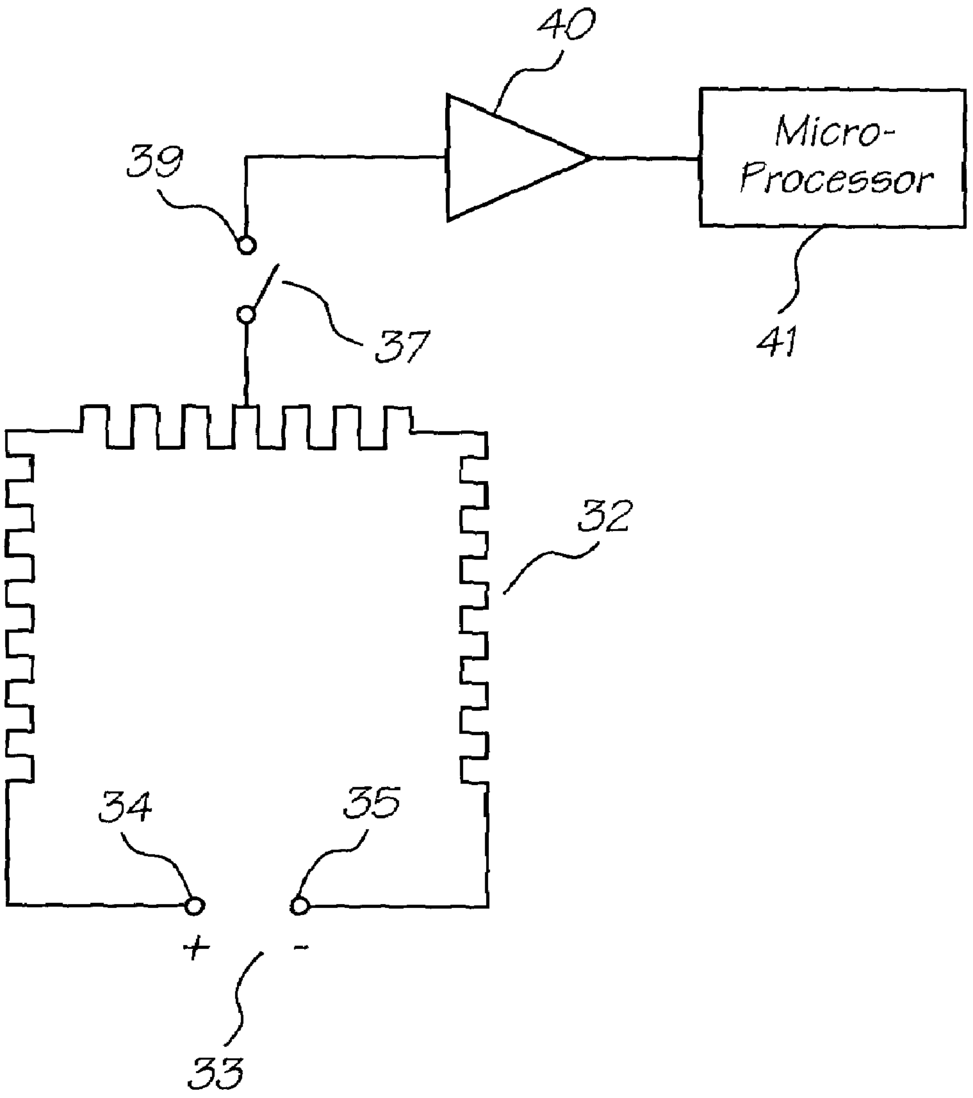
FIG. 11 shows a schematic representation of a portion of an electrical circuit that is embodied within the nozzle.

The inner portion 32 of the actuating arm 28 is formed from a titanium-aluminium-nitride (TiAl)N deposit during formation of the nozzle device and it is connected electrically to a current source 33, as illustrated schematically in FIG. 11, within the CMOS structure. The electrical connection is made to end terminals 34 and 35, and application of a pulsed excitation (drive) voltage to the terminals results in pulsed current flow through the inner portion only of the actuating arm 28. The current flow causes rapid resistance heating within the inner portion 32 of the actuating arm and consequential momentary elongation of that portion of the arm.

The outer arm portion 31 of the actuating arm 28 is mechanically coupled to but electrically isolated from the inner arm portion 32 by posts 36. No current-induced heating occurs within the outer arm portion 31 and, as a consequence, voltage induced current flow through the inner arm portion 32 causes momentary bending of the complete actuating arm 28 in the manner indicated in FIGS. 8, 9 and 10 of the drawings. This bending of the actuating arm 28 is equivalent to pivotal movement of the arm with respect to the substrate 20 and it results in displacement of the paddle 27 within the chambers 24 and 25.

An integrated movement sensor is provided within the device in order to determine the degree or rate of pivotal movement of the actuating arm 28 and in order to permit fault detection in the device.

The movement sensor comprises a moving contact element 37 that is formed integrally with the inner portion 32 of the actuating arm 28 and which is electrically active when current is passing through the inner portion of the actuating arm. The moving contact element 37 is positioned adjacent the second end 38 of the actuating arm and, thus, with a voltage V applied to the end terminals 34 and 35, the moving contact element will be at a potential of approximately V/2. The movement sensor also comprises a fixed contact element 39 which is formed integrally with the CMOS layer 22 and which is positioned to be contacted by the moving contact element 37 when the actuating arm 28 pivots upwardly to a predetermined extent. The fixed contact element is connected electrically to amplifier elements 40 and to a microprocessor arrangement 41, both of which are shown in FIG. 11 and the component elements of which are embodied within the CMOS layer 22 of the device.

Figure 8:
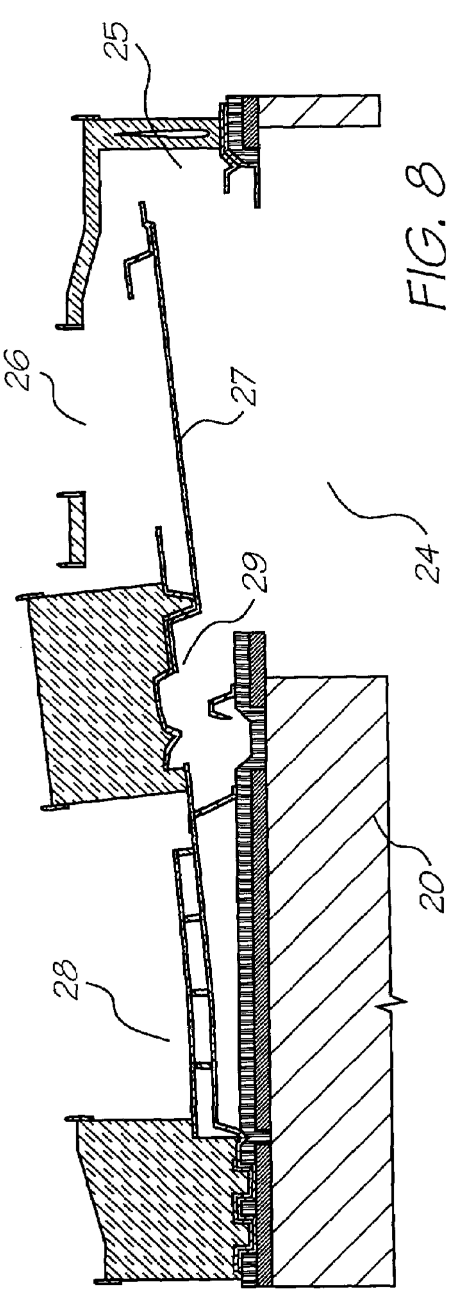
FIG. 8 shows a sectional elevation view of the nozzle of FIG. 7 but with the actuating arm and paddle actuated to a test position.
Figure 9:
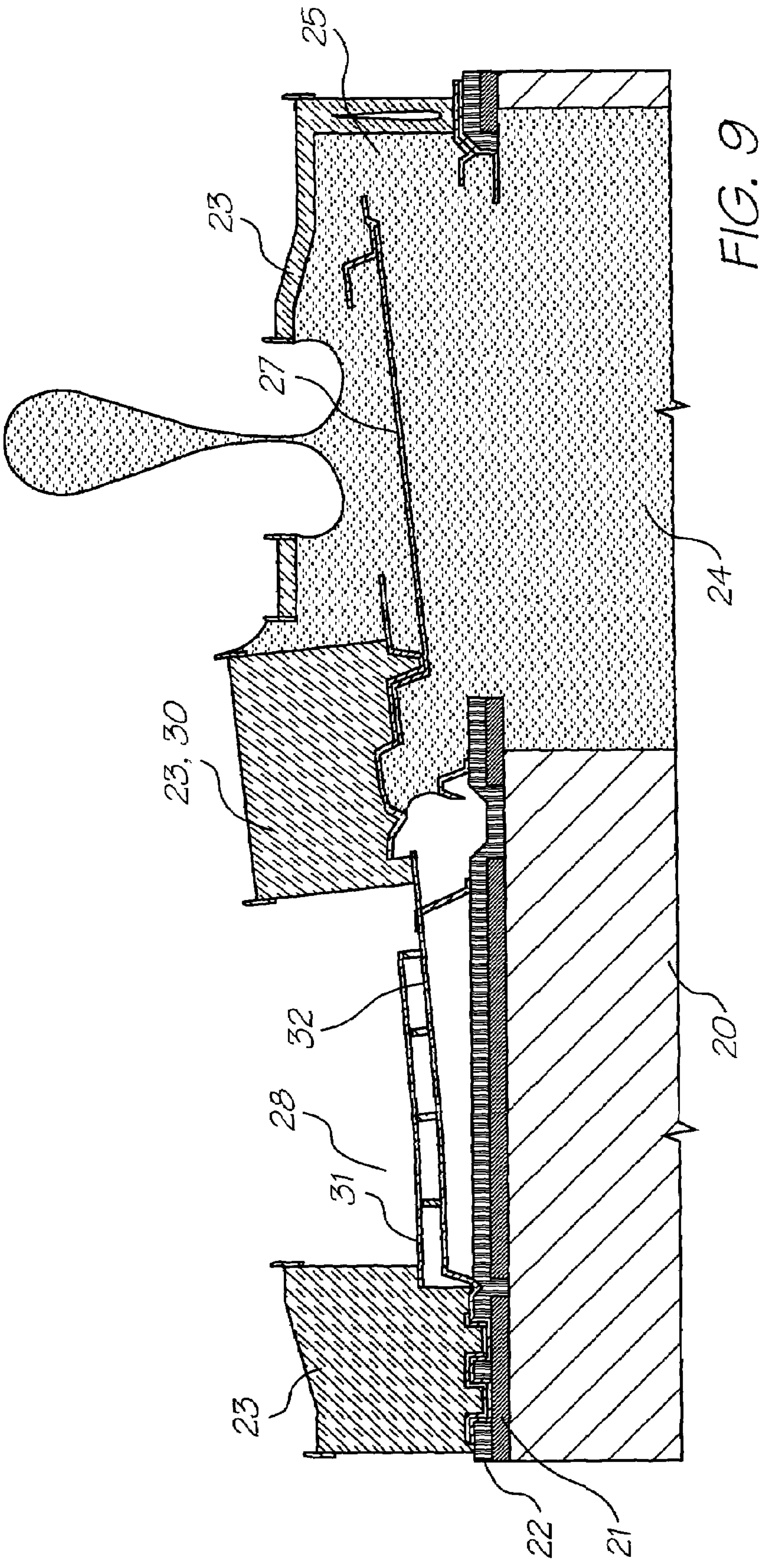
FIG. 9 shows ink ejection from the nozzle when actuated under a fault clearing operation.
Figure 10:
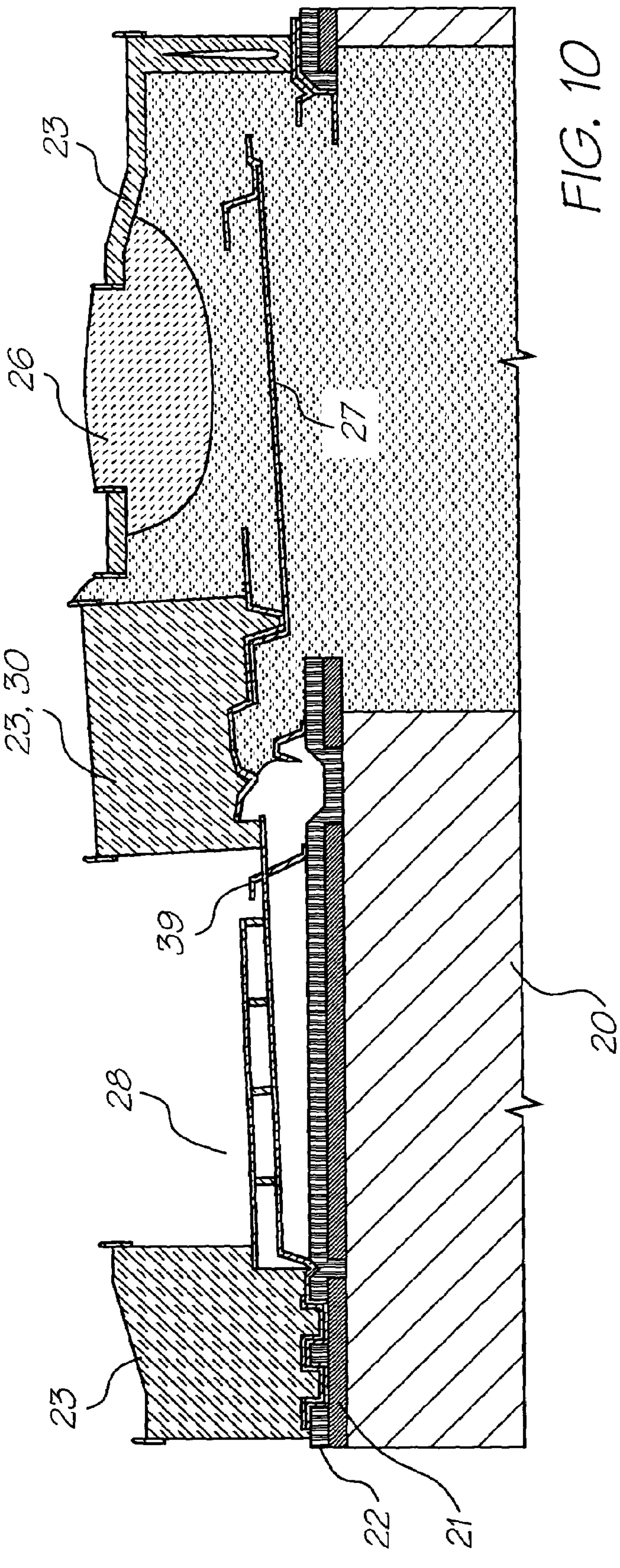
FIG. 10 shows a blocked condition of the nozzle when the actuating arm and paddle are actuated to an extent that normally would be sufficient to eject ink from the nozzle.

When the actuator arm 28 and, hence, the paddle 27 are in the quiescent position, as shown in FIGS. 1 and 7, no contact is made between the moving and fixed contact elements 37 and 39. At the other extreme, when excess movement of the actuator arm and the paddle occurs, as indicated in FIGS. 8 and 9, contact is made between the moving and fixed contact elements 37 and 39. When the actuator arm 28 and the paddle 27 are actuated to a normal extent sufficient to expel ink from the nozzle, no contact is made between the moving and fixed contact elements. That is, with normal ejection of the ink from the chamber 25, the actuator arm 28 and the paddle 27 are moved to a position partway between the positions that are illustrated in FIGS. 7 and 8. This (intermediate) position is indicated in FIG. 10, although as a consequence of a blocked nozzle rather than during normal ejection of ink from the nozzle.

Figure 12:
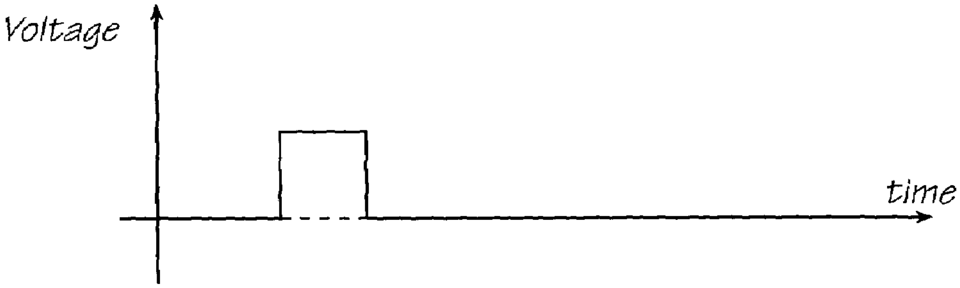
FIG. 12 shows an excitation-time diagram applicable to normal (ink ejecting) actuation of the nozzle actuating arm.
Figure 14:
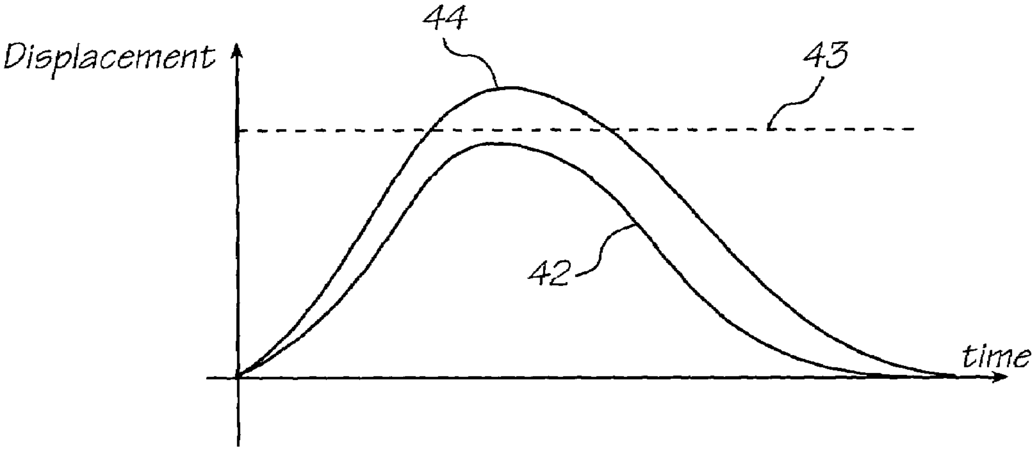
FIG. 14 shows comparative displacement-time curves applicable to the excitation-time diagrams shown in FIGS. 12 and 13.

FIG. 12 shows an excitation-time diagram that is applicable to effecting actuation of the actuator arm 28 and the paddle 27 from a quiescent to a lower-than-normal ink ejecting position. The displacement of the paddle 27 resulting from the excitation of FIG. 12 is indicated by the lower graph 42 in FIG. 14, and it can be seen that the maximum extent of displacement is less than the optimum level that is shown by the displacement line 43.

Figure 13:
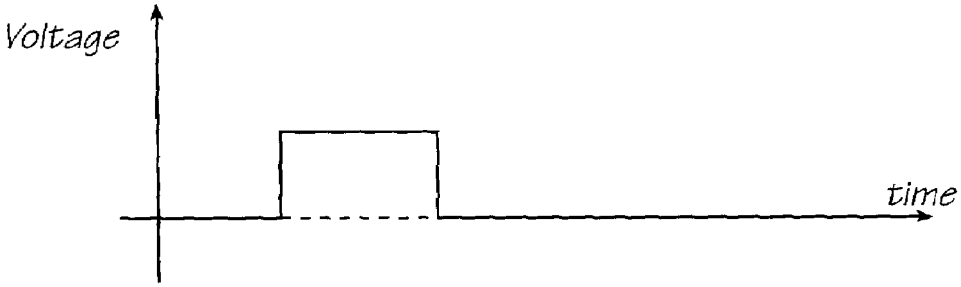
FIG. 13 shows an excitation-time diagram applicable to test actuation of the nozzle actuating arm.

FIG. 13 shows an expanded excitation-time diagram that is applicable to effecting actuation of the actuator arm 28 and the paddle 27 to an excessive extent, such as is indicated in FIGS. 8 and 9. The displacement of the paddle 27 resulting from the excitation of FIG. 13 is indicated by the upper graph 44 in FIG. 14, from which it can be seen that the maximum displacement level is greater than the optimum level indicated by the displacement line 43.

Figure 15:
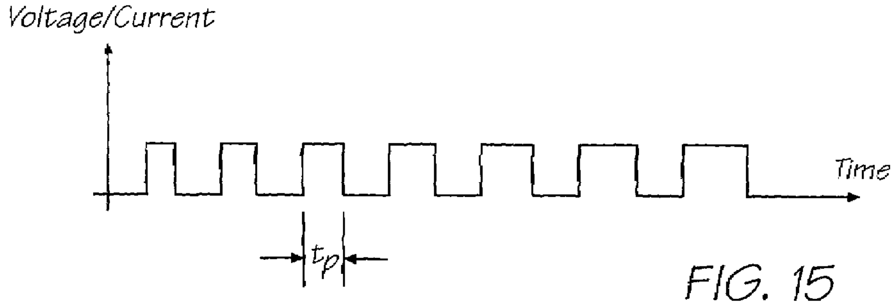
FIG. 15 shows an excitation-time diagram applicable to a fault detection procedure.
Figure 16:
FIG. 16 shows a temperature-time diagram that is applicable to the nozzle actuating arm and which corresponds with the excitation-time diagram of FIG. 15.
Figure 17:
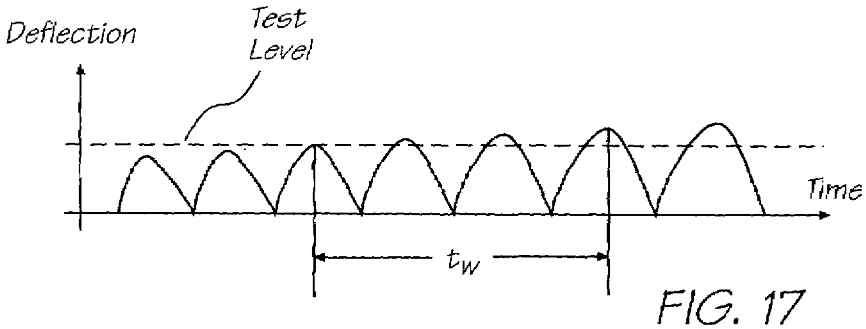
FIG. 17 shows a deflection-time diagram that is applicable to the nozzle actuating arm and which corresponds with the excitation/heating-time diagrams of FIGS. 15 and 16.

FIGS. 15, 16 and 17 shows plots of excitation voltage, actuator arm temperature and paddle deflection against time for successively increasing durations of excitation applied to the actuating arm 28.

The device can be calibrated to determine an optimal level of displacement of the actuator arm by applying a series of current pulses of increasing duration as shown in FIG. 15. From these current pulses, the relationship between the current pulse width and displacement can be determined, which relationship can also determine the minimum current pulse to achieve correct operation, as indicated by the test level line in FIG. 17. By correctly calibrating the device, minimum energy can be applied to the device while still achieving correct operation.

The plots shown in FIGS. 15, 16 and 17 also have relevance to fault detection in the nozzle device.

When detecting for a fault condition in the nozzle device or in each device in an array of the nozzle devices, a series of current pulses of successively increasing duration $t_p$ are induced to flow that the actuating arm 28 over a time period t. The duration $t_p$ is controlled to increase in the manner indicated graphically in FIG. 15.

Each current pulse induces momentary heating in the actuating arm and a consequential temperature rise, followed by a temperature drop on expiration of the pulse duration. As indicated in FIG. 16, the temperature rises to successively higher levels with the increasing pulse durations as shown in FIG. 15.

As a result, as indicated in FIG. 17, under normal circumstances the actuator arm 28 will move (i.e. pivot) to successively increasing degrees, some of which will be below that required to cause contact to be made between the moving and fixed contact elements 37 and 39 and others of which will be above that required to cause contact to be made between the moving and fixed contact elements. This is indicated by the "test level" line shown in FIG. 17. However, if a blockage occurs in a nozzle device, as indicated in FIG. 10, the paddle 27 and, as a consequence, the actuator arm 28 will be restrained from moving to the normal full extent that would be required to eject ink from the nozzle. As a consequence, the normal full actuator arm movement will not occur and contact will not be made between the moving and fixed contact elements 37 and 39.

If such contact is not made with passage of current pulses of the predetermined duration $t_p$ through the actuating arm, it might be concluded that a blockage has occurred within the nozzle device. This might then be remedied by passing a further current pulse through the actuating arm 28, with the further pulse having an energy level significantly greater than that which would normally be passed through the actuating arm. If this serves to remove the blockage ink ejection as indicated in FIG. 9 will occur.

As an alternative, simpler, procedure toward fault detection, a single current pulse as indicated in FIG. 12 may be induced to flow through the actuator arm and detection be made simply for sufficient movement of the actuating arm to cause contact to be made between the fixed and moving contact elements.

Variations and modifications may be made in respect of the device as described above as a preferred embodiment of the invention without departing from the scope of the appended claims.

The invention claimed is:

1. A microelectromechanical fluid ejection device configured for detecting a fault condition, said device comprising:

a mechanical actuator, said actuator being displaceable upon receipt of an electrical current, said displacement causing ejecting of fluid from an aperture in the device;

drive circuitry for supplying the electrical current to the actuator; and a switch device for determining an extent of displacement of the actuator, said switch device comprising:

a contact element positioned for contact with the actuator at a predetermined extent of displacement; and processing circuitry for detecting when the actuator makes contact with the contact element.

2. The fluid ejection device of claim 1, wherein the current is directed to the processing circuitry when the actuator makes contact with the contact element.

3. The fluid ejection device of claim 1, wherein the processing circuitry is configured for registering a fault condition when the actuator makes contact with the contact element.

4. The fluid ejection device of claim 1, further comprising a paddle connected to the actuator, the paddle being displaced upon actuation of the actuator, thereby ejecting fluid from the aperture.

5. The fluid ejection device of claim 1, wherein the paddle is suspended in an ink chamber.

* * * * *